United States Patent [19]

Schell et al.

[11] Patent Number: 5,457,520
[45] Date of Patent: Oct. 10, 1995

[54] DUAL SNAP FIT BEARING

[75] Inventors: Richard P. Schell, Webster; Brian E. Gangloff; Bruce C. Reynolds, both of Rochester, all of N.Y.

[73] Assignee: Xerox Corporation, Stamford, Conn.

[21] Appl. No.: 274,927

[22] Filed: Jul. 14, 1994

[51] Int. Cl.⁶ .............................. G03G 5/00; F16C 13/00; F16C 35/00
[52] U.S. Cl. ............................................. 355/213; 384/419
[58] Field of Search ...................... 355/210–213, 355/200; 384/419, 418, 439, 295; 428/608, 609; 492/15

[56] References Cited

U.S. PATENT DOCUMENTS

| | | |
|---|---|---|
| 4,513,771 | 4/1985 | Thomas et al. ........................ 137/315 |
| 4,951,599 | 8/1990 | Damji ................................ 355/200 X |
| 4,964,191 | 10/1990 | Wyatt ..................................... 16/87.2 |
| 5,028,966 | 7/1991 | Kozuka et al. ..................... 355/210 X |
| 5,053,817 | 10/1991 | Ogiri et al. ............................. 355/211 |
| 5,111,244 | 5/1992 | Koyama et al. ......................... 355/210 |
| 5,115,272 | 5/1992 | Ohmori et al. ......................... 355/200 |
| 5,145,265 | 9/1992 | Flem ....................................... 384/296 |
| 5,201,852 | 4/1993 | Ogoshi ............................... 355/200 X |
| 5,213,322 | 5/1993 | Matsuo et al. ..................... 355/212 X |
| 5,249,519 | 10/1993 | McChesney .............................. 101/99 |
| 5,283,621 | 2/1994 | Hashizume ......................... 384/418 X |
| 5,341,200 | 8/1994 | Thomas ............................. 355/200 X |
| 5,367,364 | 11/1994 | Michlin et al. ..................... 355/210 X |

FOREIGN PATENT DOCUMENTS

| | | | |
|---|---|---|---|
| 00667818 | 10/1929 | France | 384/419 |
| 0123375 | 5/1990 | Japan | 355/211 |
| 0130562 | 5/1990 | Japan | 355/211 |
| 0230173 | 10/1991 | Japan | 355/210 |
| 0130874 | 5/1994 | Japan | 355/211 |
| 0077957 | 8/1933 | Sweden | 384/419 |

*Primary Examiner*—Matthew S. Smith
*Attorney, Agent, or Firm*—John S. Wagley

[57] ABSTRACT

A bearing for supporting a moving member on a support structure. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

27 Claims, 4 Drawing Sheets

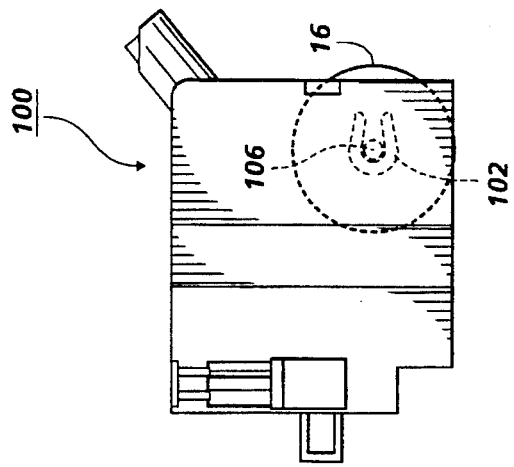
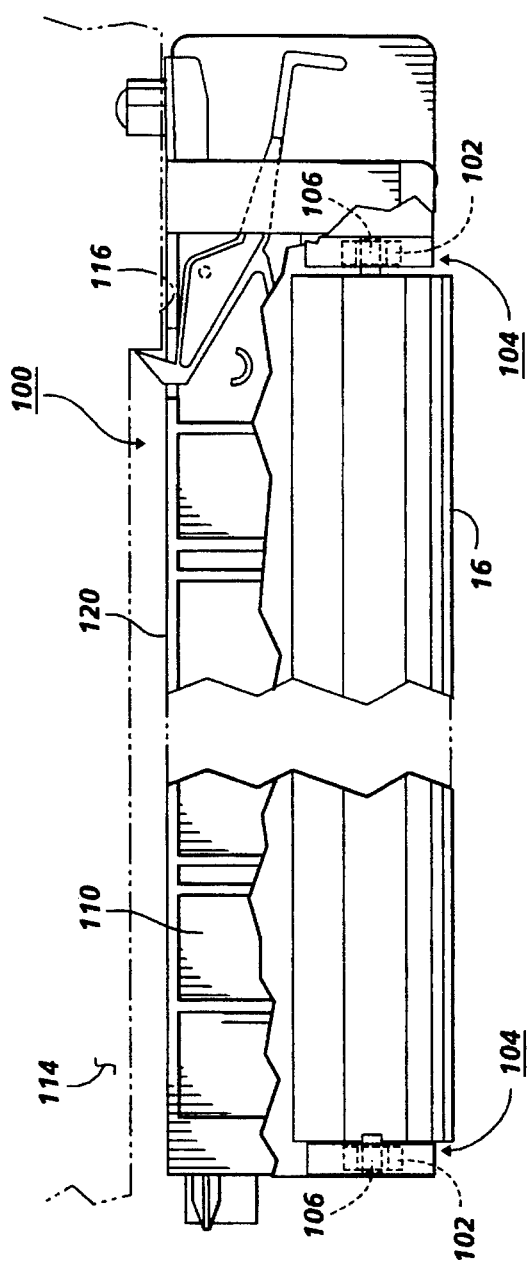

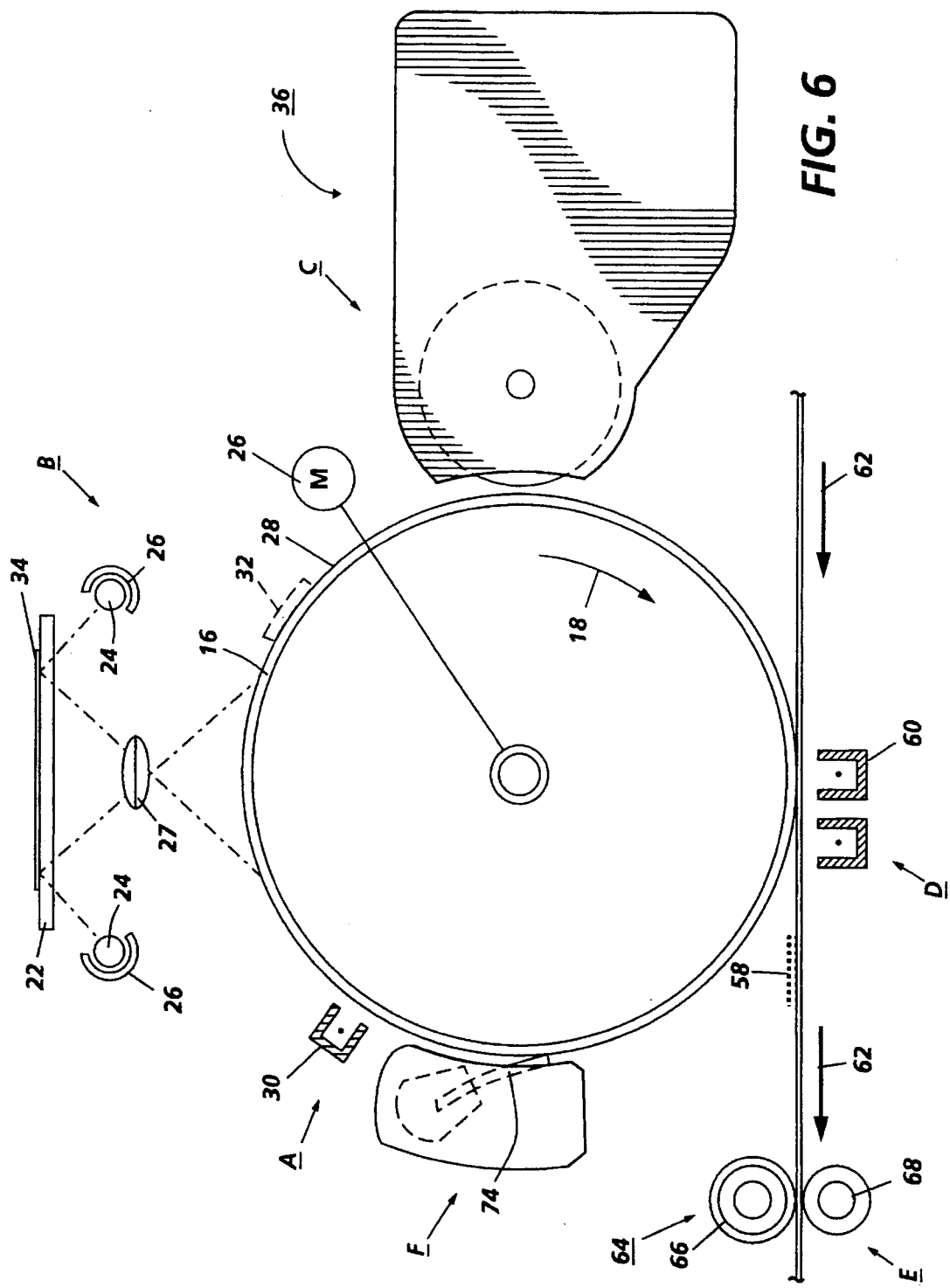

DUAL SNAP FIT BEARING

The present invention relates to a method and apparatus for supporting a load with a bearing. More specifically, the invention relates to a snap fit bearing to support a shaft.

Bearings of various types including sleeve, ball and roller bearings are typically used to support rotating members. The bearings are generally cylindrical in shape and contain the rotating member within the periphery of the bearing. The bearings are typically permanently secured to a support structure by a cylindrical bore therein.

The assembly and disassembly of devices having rotating members is difficult and time consuming due to the necessity of both extracting the bearing from the support structure and extracting the rotating member from within the bearing, both extractions being required to be performed along the axis of the rotating member and the bearing.

Since bearings include wear surfaces and must be frequently replaced in structures, the difficulty in disassembly and reassembly is particularly plaguing. This situation is further exasperated when the rotating member is also an item with limited life that must be periodically replaced.

The photoconductive drum of an electrophotographic printing machine is such a rotating member that must periodically be replaced. The difficulty in replacing the photoconductive drum is therefore a particularly plaguing problem.

In the well-known process of electrophotographic printing, the photoconductive member is electrostatically charged, and then exposed to a light pattern of an original image to selectively discharge the surface in accordance therewith. The resulting pattern of charged and discharged areas on the photoconductive member forms an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the photoconductive member is cleaned from the surface thereof. The process is useful for light lens copying from an original or printing electronically generated or stored originals such as with a raster output scanner (ROS), where a charged surface may be imagewise discharged in a variety of ways.

The following disclosures may be relevant to various aspects of the present invention:

U.S. Pat. No. 5,249,519 Patentee: McChesney Issue Date: Oct. 5, 1993

U.S. Pat. No. 5,145,265 Patentee: Flem Issue Date: Sep. 8, 1992

U.S. Pat. No. 4,964,191 Patentee: Wyatt Issue Date: Oct. 23, 1990

U.S. Pat. No. 4,513,771 Patentee: Thomas et al. Issue Date: Apr. 30, 1985

U.S. Pat. No. 5,249,519 discloses a postage meter with a rotatable print drum. A gear reduction system including several shafts is used to transmit torque to the drum. The shafts are supported by bearing clips which have circular apertures for receiving the shafts. The side edges of the clips contain channels which guide the clip when it is slid into a slot formed in the lower gear reduction system.

U.S. Pat. No. 5,145,265 discloses a double pop-in bearing produced from a polymeric material for use with various diameter workpieces. The bearing has a diagonal longitudinal gap to permit compression of the bearing to permit it to lock into a bore. The bearing has a projectile on the flange to mate with a notch near the bore of the workpiece.

U.S. Pat. No. 4,964,191 discloses a vertical blind system which includes a cartridge assembly with a circular top which mates with a circular bearing. A flexible retaining clip associated with the circular bearing prevents the cartridge assembly from falling out of he bearing.

U.S. Pat. No. 4,513,771 discloses an air valve with a valve plate with snap in bearings on each end. The snap in bearings each have a pair of adjacent fingers with a notch therebetween extending from one of the fingers. The valve plate fits between the adjacent fingers and has an aperture that engages with the notch to lock the finger in place.

SUMMARY OF THE INVENTION

In accordance with one aspect of the present invention, there is provided a bearing for supporting a moving member on a support structure. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

In accordance with another aspect of the present invention, there is provided a customer replaceable unit including a processing station for use in a printing machine. The customer replaceable unit includes a bearing for supporting a moving member on a support structure. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

In accordance with yet another aspect of the present invention, there is provided an electrophotographic printing machine of the type having an electrostatic latent image recorded on a photoconductive member, including a bearing for supporting the photoconductive member. The bearing is securable to a support structure of the printing machine. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

BRIEF DESCRIPTION OF THE DRAWINGS

The invention will be described in detail herein with reference to the following figures in which like reference numerals denote like elements and wherein:

FIG. 4 is an elevational view of an embodiment of the dual snap fit bearing of the present invention installed onto a customer replaceable unit of an electrophotographic copy machine;

FIG. 5 is an end elevational view of the dual snap fit bearing of FIG. 4; and

FIG. 6 is a schematic elevational view of an illustrative electrophotographic printing machine incorporating the dual snap fit bearing of the present invention therein.

Figure 1:
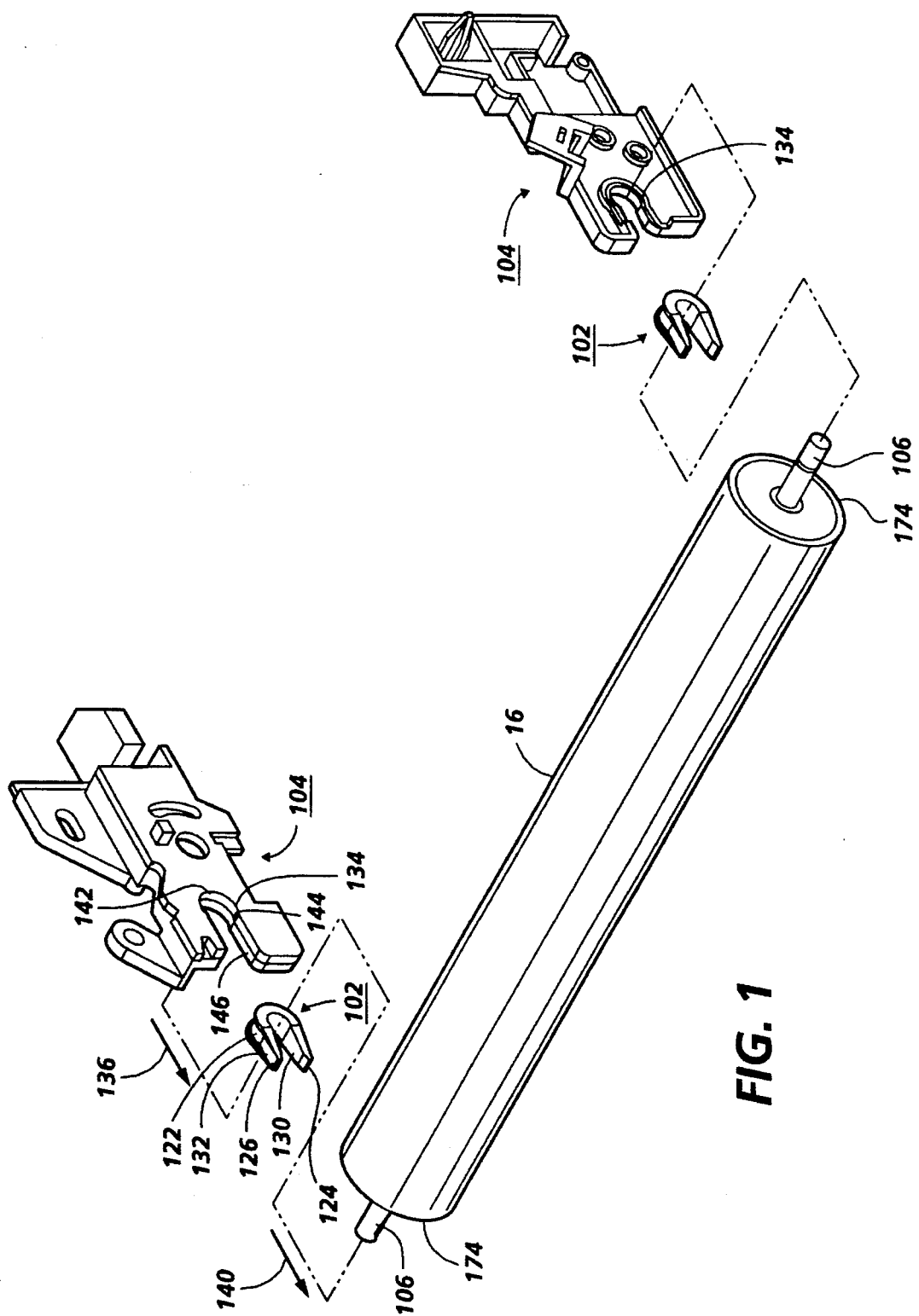
FIG. 1 is an exploded, perspective view of an embodiment of the dual snap fit bearing of the present invention installed onto a shaft.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the illustrative electrophotographic printing machine incorporating the features of the present invention therein, reference is made to the drawings. In the drawings, like reference numerals have been used throughout to designate identical elements. FIG. 6 schematically depicts the various components of an electrophotographic printing machine incorporating the dual snap in bearings of the present invention therein. Although the dual snap in bearings of the present invention are particularly well adapted for use in the illustrative printing machine, it will become evident that these dual snap in bearings are equally well suited for use in a wide variety of machines where rotating members are supported by bearings and are not necessarily limited in their application to the particular embodiments shown herein.

Referring now to FIG. 6, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 26 rotates drum 16 to advance drum 16 in the direction of arrow 18. Drum 16 is coupled to motor 26, by suitable means such as a drive.

Initially successive portions of drum 16 pass through charging station A. At charging station A, a corona generating device, indicated generally by the reference numeral 30, charges the drum 16 to a selectively high uniform electrical potential. The electrical potential is normally opposite in sign to the charge of the toner. Depending on the toner chemical composition, the potential may be positive or negative. Any suitable control, well known in the art, may be employed for controlling the corona generating device 30.

A document 34 to be reproduced is placed on a platen 22, located at imaging station B, where it is illuminated in a known manner by a light source such as a lamp 24 with a photo spectral output matching the photo spectral sensitivity of the photoconductor. The document thus exposed is imaged onto the drum 16 by a system of mirrors 26 and lens 27, as shown. The optical image selectively discharges surface 28 of the drum 16 in an image configuration whereby an electrostatic latent image 32 of the original document is recorded on the drum 16 at the imaging station B.

At development station C, a development system or unit, indicated generally by the reference numeral 36 advances developer materials into contact with the electrostatic latent images. The developer unit includes a device to advance developer material into contact with the latent image.

The developer unit 36, in the direction of movement of drum 16 as indicated by arrow 18, develops the charged image areas of the photoconductive surface. This developer unit contains black developer, for example, material 44 having a triboelectric charge such that the black toner is urged towards charged areas of the latent image by the electrostatic field existing between the photoconductive surface and the electrically biased developer rolls in the developer unit which are connected to the bias power supply 42.

A sheet of support material 58 is moved into contact with the toner image at transfer station D. The sheet of support material 58 is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of drum 16, the residual toner particles carried by image and the non-image areas on the photoconductive surface are removed at cleaning station F. The cleaning station F includes a blade 74.

It is believed that the foregoing description is sufficient for purposes of the present application to illustrate the general operation of an electrophotographic printing machine incorporating the development apparatus of the present invention therein.

According to the present invention, and referring to FIGS. 4 and 5, a customer replaceable unit 100 is shown utilizing snap in bearings 102 of the present invention. The bearings 102 are located and supported by support brackets 104 which are located within the customer replaceable unit 100. The bearings 102 support cylindrical shafts 106 which extend centrally outward from the ends of the photoreceptor drum 16 (see FIG. 6).

The customer replaceable unit 100 includes a housing or cartridge 110 to which several components, namely those components found to require replacement on a more frequent basis within a copy machine or printing machine, are mounted. Typically, the customer replaceable unit 100 includes the photoreceptor drum 16 and other items determined to wear at a significant rate. For example, the customer replaceable unit 100 may include the blade 74 of the cleaning station F and the corona generating device 30 of the charging station A (see FIG. 6).

To aid in the easy servicing of a copy machine or printing machine 112, customer replaceable unit 100 is typically designed to be easily removed from the copy machine 112. A typical example for the use of replacement of the customer replaceable unit 100 includes a support structure 114 of the copy machine 112 which includes rails 116 to which outer faces 120 of the customer replaceable unit 100 matingly slide.

Customer replaceable units 100 are changed several times during the life of the copy machine 112. The customer replaceable unit 100 is recently being remanufactured rather than being replaced with a new customer replaceable unit. The photoreceptor drum 16 is typically replaced during each remanufacture of a customer replaceable unit 100, therefore, it is very important that the photoreceptor drum 16 be easily removed from the customer replaceable unit 100. The snap in bearings 102 serve to assist in the ease of removing and replacing the photoreceptor drum 16 within the customer replaceable unit 100. Furthermore, if the photoreceptor is not replaced itself, it nevertheless must be removed to facilitate cleaning and the removal of other components such as the cleaning blade 74 (see FIG. 6).

Now referring to FIG. 1, the bearings 102 and support brackets 104 are shown in greater detail. The bearings 102 include a semi circular ring portion 122 from which extend first and second leg portions 124 and 126, respectively. The portions 122, 124, and 126 define an internal periphery 130 of the bearings 102 which internal periphery 130 is fitted over the shafts 106 of the moving member or photoreceptor drum 16. The leg portions 124 and 126 and the semi circular ring portion 122 also define an external periphery 132 which is matingly fitted within a saddle 134 located within the support brackets 104.

The bearings 102 during assembly are first snapped into saddle 134 of the support brackets 104 and subsequently the shafts 106 of the photoreceptor drum 16 are snapped into the bearings 102. The respective shapes of the saddle 134 and the external and internal peripheries 132 and 130, respectively of the bearings 102 are so selected that separation force 136 required to separate the bearings 102 from the saddle 134 is greater than separation force 140 required to separate the bearings 102 from the shafts 106 of the photoreceptor drum 16. This feature provides for the retention of the bearings 102 within the saddle 134 when, as typically occurs only the photoreceptor drum 16 and not the bearings 102 need to be replaced during remanufacturing of the customer replaceable unit 100.

To matingly cooperate with the external periphery 132 of the bearing 102, the saddle 134 of the support brackets 104 includes a arcuate contact zone 142 which is generally semi circular in shape. The saddle 134 also includes a saddle lip 144 which extends at the edges of the arcuate contact zone 142. Extending outwardly from the saddle lip 144 are tapered portions 146 of the saddle 134 which aid in the insertion of the bearings 102 into the saddles 134 of the support brackets 104.

Figure 2:
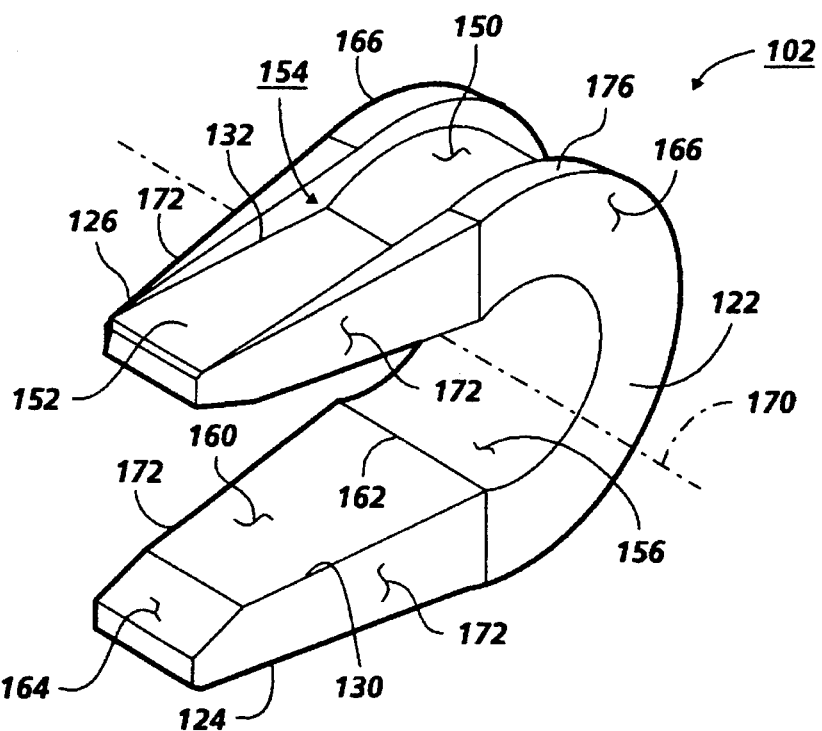
FIG. 2 is a perspective view of the dual snap fit bearing of FIG. 1.

Now referring to FIG. 2, the bearing 102 is shown in greater detail. The bearing 102 has a generally U-shape configuration including the semi circular ring portion 122 and the first and second leg portions 124 and 126 extending respectively therefrom. The external periphery 132 of the U-shaped member includes a saddle arcuate contact zone 150 located around the external periphery 132 of the bearing 102 in the semi circular ring portion 122 thereof. The saddle arcuate contact zone 150 has a generally cylindrical shape and extends outwardly toward a tapered portion 152 of the external periphery which is located in the first and second leg portions 124 and 126, respectively. The saddle arcuate contact zone 150 and the tapered portion 152 define a saddle securing recess 154 therebetween which cooperates with the saddle lip 144 of the saddle 134 to provide the snap in feature between the bearing 102 and the saddle 134 (see FIG. 1).

Again referring to FIG. 2, to secure the bearing 102 to the shafts 106 of the photoreceptor drum 16, the internal periphery 130 of the bearing 102 includes a shaft arcuate contact zone 156 located within the semi circular ring portion 122 of the bearing 102. Tapered portions 160 of the inner periphery 130 extend outwardly from the shaft arcuate contact zone 156 and form shaft securing lips 162 therebetween. To assist in the assembly of the shafts 106 of the photoreceptor drum 16 into the bearings 102, the tapered portions 160 of the inner periphery 130 have lead in chamfers 164 extending therefrom to guide the shafts 106 (see FIG. 1) into the tapered portion 160 of the bearings 102.

While the saddle lip 144 and the shaft securing lips 162 may provide a snap in feature to secure the photoreceptor drum 16 in place during operation of the copy machine 112 and consequently withstand a moderate radial force in any direction, it should be appreciated that the normal force exerted upon the photoreceptor drum 16 should preferably be in a direction toward the semi circular ring portion 122 of the bearing 102.

Faces 166 of the bearing 102 are generally perpendicular to axis 170 of the bearing 102. Extending from the faces 166 at the leg portions 124 and 126 of the bearing 102 are tapered faces 172 which are slightly tapered inwardly from the faces 166. The tapered faces 172 prevent interference between the bearing 102 and outer edges 174 of the photoreceptor drum 16 (see FIG. 1).

The bearing 102 may be made of any suitable durable material having the necessary resilient properties to permit the bearing 102 to snap into the saddle 134 and for the shafts 106 to snap into the bearings 102. For example, the bearing 102 may be made from a metal or from a synthetic material. Preferably, however, to minimize material cost and manufacturing cost for the bearing 102 and to optimize lubricity and wear characteristics for the bearing, the bearing 102 is preferably molded from a synthetic material such as polycarbonate. To enhance the wear and operating characteristics of the bearing 102, Teflon, a trademark of duPont, Inc., which is a polytetrafluoroethylene may be added to the material. Also glass may be added to improve dimensional stability of the bearing 102. A material of polycarbonate with 10% glass and 15% Teflon has been found to be particularly effective.

Again referring to FIG. 2, to obtain the proper resiliency for the bearing 102, when using a moldable material, external ribs 176 may extend outwardly from the edges of the external periphery 132 of the bearing 102. The ribs 176 also serve to prevent lateral movement of the bearing 102.

Figure 3A:
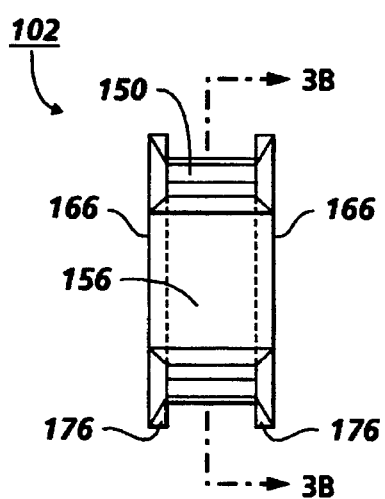
FIG. 3A is an elevational view of the dual snap fit bearing of FIG. 1.
Figure 3B:
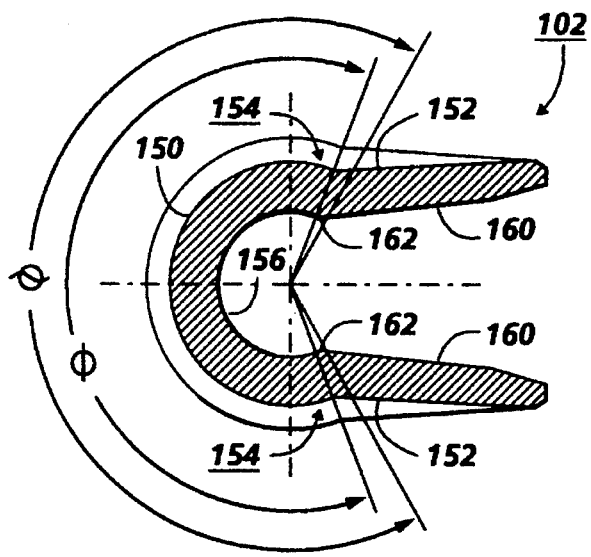
FIG. 3B is a sectional elevational view taken along the line 3B—3B in the direction of the arrows of FIG. 3A.

Referring now to FIGS. 3A and 3B, the saddle and shaft arcuate contact zones 150 and 156, respectively, can be more accurately seen. The saddle arcuate contact zone 150 extends to the tapered portions 152 of the external periphery 132 of the bearing 102. The saddle securing recesses 154 define an angle Φ of the saddle arcuate contact zone 150. In order to obtain a snap fit between the saddle arcuate contact zone 150 and the arcuate contact zone 144 of the saddle 134, the angle Φ must exceed 180 degrees. The proper angle of Φ depends upon the resiliency of the material used for the bearing and the relative size of the cross section of the bearing 102. Typically, the angle Φ ranges between approximately 215 and 235 degrees with 225 degrees being nominal.

The location of the lips 162 between the shaft arcuate contact zone 156 and the tapered portion 160 of the internal periphery 130 define the shaft arcuate contact zone angle θ. To provide for a snap fit between the bearing 102 and the shafts 106 of the photoreceptor drum 16, the angle of θ must exceed 180 degrees. The proper angle θ is dependent upon the resiliency of the material used to manufacture the bearing 102 and the relative cross sectional area of the bearing 102. Typically, the value of θ is preferably between 225 and 245 degrees with 235 degrees being nominal.

While the internal and external peripheries 130 and 132, respectively, of the bearing 102 with the arcuate and tapered portions thereof as shown in FIGS. 1–6 are illustrative of the invention, other shapes of the internal and external peripheries of the bearing may likewise fall within the scope of the invention. For example, the bearing may include bullet shaped portions to provide the lead in features at the location where the leg portions 124 and 126 of the bearing 102 of FIG. 2 exist. Further, the shaft arcuate contact zone 156 of the bearing 102 of FIG. 2 which is shown to exceed 180 degrees may likewise be replaced with a shaft arcuate contact zone of less than 180 degrees and separate lip or lips extending inwardly from the internal periphery to contain the shafts. Likewise, the snap in feature of the saddle arcuate contact zone 150 of the bearing 102 of FIG. 2 may likewise be replaced with a saddle arcuate contact zone of less than 180 degrees and a combination of a lip and a recess on the bearing and the saddle, respectively, to cooperate to secure the bearing within the saddle. The example shown in FIGS. 1–6 is merely illustrative of the inventors' concept.

By providing a U-shaped bearing, a moving member such as a photoconductive drum may be easily assembled thereto.

By providing shaft securing lips to the inner periphery of the U-shaped bearing, the moving member may be locked into the bearing and yet require no tools to assemble or disassemble these pieces from each other.

By providing a saddle securing recess in the outer periphery of the U-shaped bearing which mates with a protrusion on the saddle, the bearing may be positively secured within the saddle.

By providing a separation between the bearing and the saddle greater than that between the bearing and the moving member, the moving member may be removed without removing the bearing.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A bearing for supporting a moving member on a support structure, comprising:

a substantially U-shaped member having an internal periphery and an external periphery;

first means, associated with the internal periphery of said U-shaped member, for securing the moving member to said U-shaped member; and second means, associated with the external periphery of said U-shaped member, for securing said U-shaped member to the support structure.

2. A bearing according to claim 1, wherein said U-shaped member comprises a resilient material.

3. A bearing according to claim 2, wherein said first securing means comprises a lip extending inwardly from a free end of the internal periphery of said U-shaped member.

4. A bearing according to claim 3, wherein said lip is integral with said U-shaped member.

5. A bearing according to claim 4, wherein said U-shaped member contacts the moving member over an angle of about 180° forming a moving member contact zone therewith.

6. A bearing according to claim 4, wherein said U-shaped member contacts the moving member over an angle ranging between 210° and 225°.

7. A bearing according to claim 3, wherein said second securing means comprises a portion of the external periphery of said member adapted to be mounted on said support structure.

8. A bearing according to claim 7, wherein said U-shaped member contacts the support structure over an angle of about 180° forming a support structure contact zone therewith.

9. A bearing for supporting a moving member on a support structure, comprising:

a substantially U-shaped resilient member having an internal periphery and an external periphery, the internal periphery having a tapered region adjacent a contact zone;

a lip extending inwardly from a free end of the internal periphery of said U-shaped member, for securing the moving member to said U-shaped member; and second means, associated with the external periphery of said U-shaped member, for securing said U-shaped member to the support structure.

10. A customer replaceable unit including a processing station for use in a printing machine, said customer replaceable unit including a bearing for supporting a moving member on a support structure, the bearing comprising:

a substantially U-shaped member having an internal periphery and an external periphery;

first means, associated with the internal periphery of said U-shaped member, for securing the moving member to said U-shaped member; and second means, associated with the external periphery of said U-shaped member, for securing said U-shaped member to the support structure.

11. A customer replaceable unit according to claim 10, wherein said U-shaped member comprises a resilient material.

12. A customer replaceable unit according to claim 11, wherein said first securing means comprises a lip extending inwardly from a free end of the internal periphery of said U-shaped member.

13. A customer replaceable unit according to claim 12, wherein said lip is integral with said U-shaped member.

14. A customer replaceable unit according to claim 13, wherein said U-shaped member contacts the moving member over an angle of about 180° forming a moving member contact zone therewith.

15. A customer replaceable unit according to claim 13, wherein said U-shaped member contacts the moving member over an angle ranging between 210° and 225°.

16. A customer replaceable unit according to claim 12, wherein said second securing means comprises a portion of the external periphery of said member adapted to be mounted on said support structure.

17. A customer replaceable unit according to claim 17, wherein said U-shaped member contacts the support structure over an angle of about 180° forming a support structure contact zone therewith.

18. A customer replaceable unit including a processing station for use in a printing machine, said customer replaceable unit including a bearing for supporting a moving member on a support structure, the bearing comprising:

a substantially U-shaped resilient member having an internal periphery and an external periphery, the internal periphery having a tapered region adjacent a contact zone;

a lip extending inwardly from a free end of the internal periphery of said U-shaped member, for securing the moving member to said U-shaped member; and second means, associated with the external periphery of said U-shaped member, for securing said U-shaped member to the support structure.

19. An electrophotographic printing machine of the type having an electrostatic latent image recorded on a photoconductive member, including a bearing for supporting the photoconductive member, the bearing being securable to a support structure of the printing machine, the bearing comprising:

a substantially U-shaped member having an internal periphery and an external periphery;

first means, associated with the internal periphery of said U-shaped member, for securing the moving member to said U-shaped member; and second means, associated with the external periphery of said U-shaped member, for securing said U-shaped member to the support structure.

20. A printing machine according to claim 19, wherein said U-shaped member comprises a resilient material.

21. A printing machine according to claim 20, wherein said first securing means comprises a lip extending inwardly from a free end of the internal periphery of said U-shaped member.

22. A printing machine according to claim 21, wherein said lip is integral with said U-shaped member.

23. A printing machine according to claim 22, wherein said U-shaped member contacts the moving member over an angle of about 180° forming a moving member contact zone therewith.

24. A printing machine according to claim 22, wherein said U-shaped member contacts the moving member over an angle ranging between 210° and 225°.

25. A printing machine according to claim 21, wherein said second securing means comprises a portion of the external periphery of said member adapted to be mounted on said support structure.

26. A printing machine according to claim 25, wherein said U-shaped member contacts the support structure over an angle of about 180° forming a support structure contact zone therewith.

27. An electrophotographic printing machine of the type having an electrostatic latent image recorded on a photoconductive member, including a bearing for supporting the photoconductive member, the bearing being securable to a support structure of the printing machine, the bearing comprising:

a substantially U-shaped resilient member having an internal periphery and an external periphery, the internal periphery having a tapered region adjacent a contact zone;

a lip extending inwardly from a free end of the internal periphery of said U-shaped member, for securing the moving member to said U-shaped member; and second means, associated with the external periphery of said U-shaped member, for securing said U-shaped member to the support structure.

* * * * *